(12) United States Patent
Goehlich et al.

(10) Patent No.: US 10,596,627 B2
(45) Date of Patent: Mar. 24, 2020

(54) METHOD OF INSTALLING A FIXTURE AND ASSOCIATED APPARATUS

(71) Applicant: AIRBUS OPERATIONS GMBH, Hamburg (DE)

(72) Inventors: Robert Alexander Goehlich, Hamburg (DE); Daisuke Hirabayashi, Hamburg (DE); Hikaru Hoshi, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 275 days.

(21) Appl. No.: 15/441,979

(22) Filed: Feb. 24, 2017

(65) Prior Publication Data

US 2017/0239722 A1 Aug. 24, 2017

(30) Foreign Application Priority Data

Feb. 24, 2016 (EP) .................... 16157120

(51) Int. Cl.
*B22F 3/105* (2006.01)
*B29B 13/08* (2006.01)
(Continued)

(52) U.S. Cl.
CPC .......... *B22F 3/1055* (2013.01); *B22F 3/1017* (2013.01); *B23K 10/003* (2013.01);
(Continued)

(58) Field of Classification Search
CPC .. B22F 3/1055; B22F 3/1017; B22F 2998/10; B22F 2003/1057; B64F 5/10;
(Continued)

(56) References Cited

U.S. PATENT DOCUMENTS

| 4,377,872 A | 3/1983 | Daniell, Jr. |
| 4,576,664 A | 3/1986 | Delahunty |

(Continued)

FOREIGN PATENT DOCUMENTS

| DE | 102012204723 A1 | 9/2013 |
| EP | 2813432 A1 | 12/2014 |

(Continued)

OTHER PUBLICATIONS

Extended European Search Report for Application No. 16157120 dated Aug. 19, 2016.

(Continued)

*Primary Examiner* — Jessee R Roe
*Assistant Examiner* — Rebecca Janssen
(74) *Attorney, Agent, or Firm* — Jenkins, Wilson, Taylor & Hunt, P.A.

(57) ABSTRACT

A method of installing a fixture or bracket in a fuselage structure of an aircraft or spacecraft. The method includes arranging an apparatus in, on or adjacent the structure, pre-treating a surface region of the structure by heat ablation using the apparatus and forming the fixture in situ on the structure at the pre-treated surface region using the apparatus based on a digital model of the fixture. The fixture is installed by connecting the fixture to the structure at the pre-treated surface region as the fixture is formed.

16 Claims, 5 Drawing Sheets

(51) Int. Cl.
  *B33Y 10/00* (2015.01)
  *B64F 5/10* (2017.01)
  *B22F 3/10* (2006.01)
  *B23K 26/08* (2014.01)
  *B33Y 30/00* (2015.01)
  *B29C 64/106* (2017.01)
  *B29C 64/118* (2017.01)
  *B33Y 80/00* (2015.01)
  *B33Y 50/02* (2015.01)
  *B23K 26/342* (2014.01)
  *B23K 10/00* (2006.01)
  *B23K 101/00* (2006.01)
  *B29C 64/35* (2017.01)

(52) U.S. Cl.
  CPC ........ *B23K 26/0884* (2013.01); *B23K 26/342* (2015.10); *B29B 13/08* (2013.01); *B29C 64/106* (2017.08); *B29C 64/118* (2017.08); *B33Y 10/00* (2014.12); *B33Y 50/02* (2014.12); *B33Y 80/00* (2014.12); *B64F 5/10* (2017.01); *B22F 2003/1057* (2013.01); *B22F 2998/10* (2013.01); *B23K 2101/006* (2018.08); *B29C 64/35* (2017.08); *B33Y 30/00* (2014.12)

(58) Field of Classification Search
  CPC .. B29B 13/08; B23K 26/342; B23K 26/0884; B23K 10/003; B23K 2101/006; B33Y 30/00; B33Y 50/02; B33Y 10/00; B29C 64/106
  USPC .......................................................... 419/47
  See application file for complete search history.

(56) References Cited

U.S. PATENT DOCUMENTS

| | | | |
|---|---|---|---|
| 5,725,185 A | 3/1998 | Auclair | |
| 5,780,806 A * | 7/1998 | Ferguson | B08B 7/0042 134/1 |
| 7,312,399 B2 | 12/2007 | Girot | |
| 9,156,240 B2 | 10/2015 | Bertrand et al. | |
| 2010/0238642 A1 | 9/2010 | Le Louarn et al. | |
| 2011/0095198 A1* | 4/2011 | Smiljanic | B22F 3/105 250/396 R |
| 2013/0295338 A1 | 11/2013 | Keating et al. | |
| 2014/0021310 A1 | 1/2014 | Marty et al. | |
| 2015/0090392 A1* | 4/2015 | Bertrand | B32B 43/00 156/64 |
| 2015/0258765 A1* | 9/2015 | Van Voast | B32B 41/00 156/64 |
| 2017/0240298 A1 | 8/2017 | Goehlich | |

FOREIGN PATENT DOCUMENTS

| | | |
|---|---|---|
| EP | 3210757 B1 | 9/2019 |
| JP | 2017-149146 A | 8/2017 |
| JP | 2017-149413 A | 8/2017 |
| WO | WO 02/073324 A2 | 9/2002 |
| WO | WO 2013/173742 A1 | 11/2013 |

OTHER PUBLICATIONS

Extended European Search Report for Application No. 16157086 dated Aug. 11, 2016.

Schumacher, C., et al., "Microstructures to Control Elasticity in 3D Printing," ACM Transactions on Graphics (TOG), vol. 34, No. 4, pp. 136:1-136:13, XP055292197, US, USSN: 0730-0301, DOI: 10.1145/2766926 (chapters 1, 8.3; figure 19), Jul. 27, 2015.

European Office Action for Application No. 16157120.3 dated Oct. 22, 2018.

European Office Action for Application No. 16157086.6 dated Nov. 16, 2018.

European Office Action for Application No. 16157120.3 dated Mar. 5, 2019.

Resriction Requirement for U.S. Appl. No. 15/441,995 dated Mar. 18, 2019.

Non-Final Office Action for U.S. Appl. No. 15/441,995 dated Aug. 2, 2019.

Final Office Action for U.S. Appl. No. 15/441,995 dated Nov. 27, 2019.

* cited by examiner

METHOD OF INSTALLING A FIXTURE AND ASSOCIATED APPARATUS

CROSS-REFERENCE TO RELATED APPLICATION

This application claims priority to European Patent Application EP 16 157120.3 filed Feb. 24, 2016, the entire disclosure of which is incorporated by reference herein.

TECHNICAL FIELD

The present disclosure relates to a method of installing a fixture, such as a bracket, on a body structure of a vehicle, particularly a body or fuselage structure of an aircraft or spacecraft, for mounting or attaching one or more items or systems with respect to that structure. The disclosure herein also relates to an apparatus for installing a fixture, such as a bracket, in or on a structure of an aircraft or spacecraft. It will be noted that the term "spacecraft" as used herein includes satellites and space station modules, as well as rockets and rocket modules, spaceships, or parts thereof.

BACKGROUND

The installation of items and/or systems, such as electrical systems with conduits and cables, in nautical, aeronautical or automotive applications typically involves the use of mounting fixtures or brackets which need to be secured to a structure (e.g., vehicle chassis or hull structure) for then supporting those systems. Conventionally, these fixtures are secured to the structure via fasteners, such as rivets, clips or screws, or via an adhesive.

Some disadvantages of mechanical fasteners, like rivets and screws, include that the fixture or bracket requires bores for the fasteners, that the fixture needs to be positioned with respect to the bores, and that it requires a fastening operation to then secure the fasteners. Depending on the particular application, the fixture or bracket may also then need to be sealed around the fasteners and bores. These steps naturally involve process costs. Disadvantages of adhesive attachment include that both the fixture or bracket and the attachment surface may require pre-treatment, like roughening and/or degreasing, and that an adhesive application operation is needed, then followed by operations to position and mount the fixture or bracket under application of pressure. These steps again involve process costs. Significant advances have already been made in these respects by the present applicant, as described in published European patent application EP 2 813 432 A1.

SUMMARY

In several aspects, the present disclosure provides a new, improved and optimised method or technique in that regard. In particular, it would be useful to provide a new method of installing a fixture or bracket in or on a structure of an aircraft or spacecraft, so that a faster or more economical procedure may be realized.

It would thus be useful to provide a new and improved method of installing a fixture or bracket in or on a structure of an aircraft or spacecraft which improves production efficiency and work-flows. It would further be desirable to provide a new and improved apparatus for installing such a fixture or bracket in or on a structure of an aircraft or spacecraft.

According to one aspect, therefore, the disclosure herein provides a method of installing a fixture, such as a bracket, in or on a structure of a vehicle, such as a body or fuselage structure of an aircraft or spacecraft, comprising the steps of:
arranging an apparatus in, on or adjacent the structure;
pre-treating a surface region of the structure by heat ablation using the apparatus; and
forming the fixture in situ on the structure at the pre-treated surface region based upon a digital model of the fixture using the apparatus, wherein the fixture is installed by connecting the fixture to the structure at the pre-treated surface region as the fixture is formed.

In this way, the installation of the fixture, including pre-treatment of the surface region of the structure at which the fixture is installed, may essentially occur automatically via the apparatus arranged in, on or adjacent to that structure. Thus, the method provides maximum flexibility in the fuselage assembly procedure and does not require separate or external manufacture of individual fixtures or brackets. Pre-treating the surface region of the structure by heat ablation is able to remove any residues or impurities on the surface that may otherwise interfere with or compromise the connection of the fixture to the structure as it is formed. For example, if the structure comprises fiber-reinforced polymer composite, such as CFRP, the ablation may effectively remove any residues of peel-plies, release films or mould release agents. Also, pre-treating via ablation may somewhat roughen the surface region for improved or enhanced connection of the fixture thereto.

There is also no need for any inventory of spare parts, as the fixtures are created directly from the digital model during installation. Similarly, there is no need for non-flying parts, e.g., which may be required to fix a bracket on the structure during a curing process but which are then later removed. Further, the design of the fixture encompasses a range of variants and can be readily adapted as design parameters change.

In a preferred embodiment, the step of forming the fixture in situ on the structure includes providing or creating a three-dimensional digital model of the fixture; arranging a head of an additive manufacturing apparatus in, on or adjacent the structure; and forming the fixture in situ on the structure with or via the head of the additive manufacturing apparatus based upon the digital model of the fixture.

In some embodiments, the step of forming the fixture in situ in or on the structure comprises building the fixture by sequentially generating and/or by building up layers of the fixture via the head of the additive manufacturing device. In this regard, the layers of the fixture may be sequentially deposited on the structure, such that the fixture is able to be built up from these layers to its final three-dimensional form based on the digital model. Accordingly, in some embodiments, the step of connecting the fixture to the body or structure comprises one or more of the layers of the fixture being bonded or fused to the fuselage structure as it or they are generated and/or deposited on the vehicle structure. Alternatively, or in addition, the one or more layers of the fixture may be bonded or fused to the fuselage structure in a curing step that follows after the layers have been generated and/or deposited on the vehicle structure.

In some embodiments, the step of bonding of the fixture to the structure includes depositing one or more layers or regions of adhesive on the structure to which the fixture is to be connected. The depositing of the layer(s) or region(s) of adhesive preferably occurs before generating and building up layers of the fixture on the structure.

In some embodiments, the step of connecting the fixture to the structure may include forming the fixture in a mechanical fit or a mechanical engagement or connection with part of the structure. Indeed, the step of connecting the fixture to the structure may also comprise a combination of bonding or fusing, together with a mechanical engagement or connection.

In some embodiments, the digital model of the fixture includes data on an intended position of the fixture within structure, and the step of pre-treating the surface region of the structure includes positioning a head of the ablation device adjacent the structure based on the digital model of the fixture. In this regard, the structure may optionally include one or more reference markers for spatial correlation to reference points in the digital model of the fixture. One or more sensors may be provided for detecting and identifying the reference markers and then positioning the head of the ablation device based upon the reference markers detected and identified.

In some embodiments, pre-treating the surface region of the structure by ablation comprises laser ablating the surface region via a laser ablation device. Thus, the step of laser ablating the surface region preferably includes one or more of: generating a laser beam; positioning a head of the laser ablation device at a predetermined spacing from the structure; focusing the laser beam onto the surface region of the structure; and/or moving the laser beam over the surface region at a predetermined spacing from the structure. The processing time for the surface pre-treatment will typically be dependent on the thickness and amount of contamination on the surface. The intensity of the laser, and thus strength of the surface treatment is adjusted via the focal length of the laser. Accordingly, if the focal length is short, the laser intensity is increased, and if the focal length is long, the laser intensity is reduced.

In some embodiments, pre-treating the surface region of the structure includes plasma ablating the surface region via a plasma ablation device. Thus, the step of plasma ablating the surface region comprises one or more of: generating a plasma stream; positioning a head of a plasma ablation device at a predetermined spacing from the structure; focusing the plasma stream onto the surface region of the structure; and moving the plasma stream over the surface region at a desired or predetermined spacing from the structure. Again, process time of the pre-treating step will depend on a thickness and amount of contamination, and the strength or intensity of the plasma ablation may be adjusted accordingly. But in general, the potential for contamination removal with plasma ablation is typically lower than with laser ablation, so that a longer process time is usually required. The plasma ablation method has the advantage, however, that it is better suited to use with a structure having a more complicated shaped surface region. In particular, the plasma method is highly suited to surface regions of complex geometry or curvature. Generally, also, the control of the spacing or gap in an airflow coupled plasma or gas plasma pre-treatment is low compared with the laser ablation method. In other words, with plasma ablation, the surface pre-treatment does not need such precise position control.

In some embodiments, the method is designed or adapted for use with a structure comprised of a composite material, especially of a fiber-reinforced polymer composite, such as a glass fiber-reinforced polymer (GFRP) composite or a carbon fiber-reinforced polymer (CFRP) composite. Thus, the additive manufacturing device may be configured to generate or form the fixture from a material that is adapted to fuse or bond with a fiber-reinforced polymer in the structure. It will be appreciated, however, that the method may also be carried out with a body structure comprised of a metal, as is typical in conventional airframes and fuselage structures, such that the additive manufacturing device is configured to generate or form the fixture from a material that can fuse or bond with the metallic structure. In addition to the fused or bonded connection that arises via this method, the fixture may also be secured with supplementary mechanical fasteners, such as rivets, screws, bolts or the like; such additional fasteners can be used to augment a connection of the fixture to the vehicle structure.

In some embodiments, the step of forming or building the fixture with the additive manufacturing device comprises any one or more of: fused deposition modelling (FDM), laser sintering (LS), selective heat sintering (SHS), and stereo-lithography (SLA). These techniques may be generally referred to as three-dimensional (3D) printing. In the case of stereo-lithography (SLA), the fixture will then typically be formed from a photo-polymer material, such as a UV-curable or UV-sensitive polymer. In the case of a fused deposition modelling (FDM) procedure, the fixture may be formed from a curable polymer or thermoplastic polymer, such as acrylonitrile butadiene styrene (ABS) or a high-density poly-ethylene (HDPE), or from a metal, like a eutectic metal. In the case of selective heat sintering (SHS) or laser sintering (LS), the fixture may be formed from near any metal alloy, which is typically provided in a powdered or granular form, but also from a range of polymers that may also be in a powdered or granular form. Examples of polymers that would be suitable for series production of fixtures with a method of the present disclosure include DSM Somos® products NanoTool™, NanoForm™, and ProtoTherm™. These polymers are UV-curable, such that they may be hardened by irradiation with UV-light after their deposition in a final shape of the fixture. In this regard, these DSM Somos® polymers typically have a bending stiffness in the range of 79 to 121 N/mm$^2$ and tension stiffness in the range of 62 to 78 N/mm$^2$ after UV-hardening. Other suitable polymers include aliphatic or semi-aromatic polyamides, such as Nylon (Toray SQ133).

In some embodiments, the three-dimensional digital model of the fixture includes data on a specific or desired position of the fixture within or on structure. Thus, the step of forming the fixture in situ preferably includes positioning the head of the additive manufacturing device within or on the structure based upon the data concerning the specific or desired position in the digital model. To this end, the body or fuselage structure may include one or more reference markers for providing a spatial correlation to reference points in the digital model of the fixture. One or more sensors may be provided for detecting and identifying the reference markers and then positioning the head of the additive manufacturing device based upon the detected and identified reference markers.

The positioning and movement of both the ablation device and the additive manufacturing device may for example be computer-controlled. For example, the ablation device and the additive manufacturing device, or at least a respective head thereof, may be provided on a robotic assembly or a robotic arm, which is controllable to move and position the head of the device based upon the 3D digital model of the fixture. In this way, a very precise pre-treatment of the surface region and a very precise positioning of a fixture or bracket in or on the body or fuselage structure can be achieved, and with a high level of repeatability.

Although the method of the disclosure herein has been described above with specific reference to a vehicle, such as an aircraft or spacecraft, it will be appreciated by persons skilled in the art that the disclosure herein is also applicable to non-vehicular structures. For example, the disclosure herein also provides a method of installing a fixture, such as a bracket, on a stationary structure, such as a mast or tower for a wind turbine or for an antenna (e.g., communication or TV antenna), a building, or other such structure. Furthermore, although the fixture may be installed with the inventive method during fabrication of the structure itself, it may also be subsequently installed in situ, e.g., via a climbing or crawling robot assembly in the case of a mast, tower, building, or space station.

By employing the above method in space via a robot assembly that incorporates the additive manufacturing device or 3D printer, e.g., to carry out a repair or an installation job on a hull or outside of an orbiting space station, an astronaut can be spared the necessity of a space-walk and associated risk. In other words, the fixture may be installed with the inventive method via a robot, which may operate unimpeded and substantially without risk in the environment of space. Thus, a movable robotic device, such as a climbing or crawling robot, can be used to perform the method of the disclosure herein.

In some embodiments, the digital model for the fixture may be created and/or modified during the installation procedure. Where the method is being carried out, for example, to conduct a repair of part of the structure, it may first be necessary to inspect and/or assess the part to be repaired before the precise shape and/or size of the fixture required can be ascertained. To this end, the method of the disclosure herein may include the step of examining a part of the structure to assess and/or determine the geometry and/or the dimensions of the fixture required, then providing or creating the three-dimensional (3D) digital model of the fixture based on the results of that examination. The robot assembly may therefore include examination equipment, such as a camera and/or one or more sensors to inspect and/or examine the part of the structure of interest.

An extension of the above concept includes the possibility of the additive manufacturing device or 3D printer, e.g., set or provided on a robot, also generating or forming structural fixtures or elements for installation on the structure (e.g., on a hull of a space station). Such fixtures or elements may also be provided in the form of tracks or rails, which may then influence or determine the movement or progress of the robot itself. These elements can, for example, be designed to chart or define a path of the robot to a specific location at which a repair may need to be undertaken.

In the context of this description of the disclosure herein, it is to be appreciated that the step of "forming" the fixture or any portion thereof may be understood in the sense of producing or fabricating that fixture or the portion thereof.

According to another aspect, the present disclosure provides an apparatus for installing a fixture, such as a bracket, in or on a structure of an aircraft or spacecraft, the apparatus comprising:

an ablation device configured to generate and direct an ablating beam or stream onto a surface region of a structure for pre-treating the surface region;

an additive manufacturing device for forming the fixture in situ on the pre-treated surface region; and a controller for controlling or operating the ablation device and/or the additive manufacturing device adjacent or at the surface region of the structure.

In some embodiments, the ablation device comprises a laser ablation device configured to generate and direct a laser beam onto the structure for laser ablating the surface region. The laser ablation device typically includes a head having one or more of: a laser focusing device to adjust a focal length of the laser beam, and at least one sensor for detecting a spacing or displacement of the head with respect to the surface region of the structure. This way, the laser ablation device may be configured to adjust the intensity of the heat ablation in dependence upon the degree of residues or impurities present and the material of the structure.

In some embodiments, the laser ablation device includes a laser head having a laser power in the range of 10 to 50 W (e.g., 20 W) and a wavelength of 1000 nm. The focusing device may comprise a convergence lens for laser beam. A convergence lens may be dependent on the spacing or distance from laser head to the target surface region. A variable focus lens will be suitable for laser surface treatment. A CL20 backpack is an example of a laser generator suitable as a hand held laser surface treatment system for this apparatus.

In some embodiments, the ablation device comprises a plasma ablation device configured to generate and direct a plasma stream onto the structure for plasma ablating the surface region. Surface contaminations are evaporated by heat of the plasma. And, the fiber-reinforced polymer (FRP) surface is roughed by the plasma at the same time of removing of contamination. The plasma ablation device will typically include a head having one or more of: a focusing device to direct or focus the plasma stream, and at least one sensor for detecting a spacing or displacement of the head with respect to the surface region. Again, the ablation device may thereby be configured to adjust the intensity of the plasma ablation depending upon the degree of residues or impurities present and the material of the structure.

In some embodiments, the plasma ablation device may include a plasma head provides as an airflow-coupled plasma head or a gas plasma head. The plasma ablation device may operate at a power in the range of 200 to 1000 W (e.g., 600 W derived from 10 kV, 60 mA AC).

In some embodiments, the additive manufacturing device comprises a head for building the fixture sequentially, especially by generating and building up layers of the fixture on the structure, wherein the layers of the fixture are sequentially deposited on the structure by the head. The head of the additive manufacturing device preferably includes a nozzle portion configured for dispensing and/or applying a bonding adhesive, especially in layers or filaments, to the structure. Further, the nozzle portion may also configured for dispensing and/or applying one or more layers of filling material for generating and building up layers or filaments of the fixture on the structure.

As noted above, each head of the apparatus desirably includes at least one distance sensor, and more preferably a plurality of distance sensors and/or contact sensors, for measuring or sensing a position or spacing of the head with respect to the surface region of the structure on which the fixture is to be formed. A high level positioning accuracy is important both for the ablation device for surface pre-treatment and for the additive manufacturing device (i.e., 3D printer) for fineness of layer pitch. This means not only robot arm positioning, but also relative accuracy of the head with respect to the structure (e.g., fuselage).

BRIEF DESCRIPTION OF THE DRAWINGS

For a more complete understanding of the present disclosure and the advantages thereof, exemplary embodiments of the disclosure herein are explained in more detail in the following description with reference to the accompanying drawings, in which like reference characters designate like parts and in which.

DETAILED DESCRIPTION

The accompanying drawings are included to provide a further understanding of the present disclosure and are incorporated in and constitute a part of this specification. The drawings illustrate particular embodiments of the disclosure herein and together with the description serve to explain the principles of the disclosure herein. Other embodiments of the disclosure herein and many of the attendant advantages of the disclosure herein will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
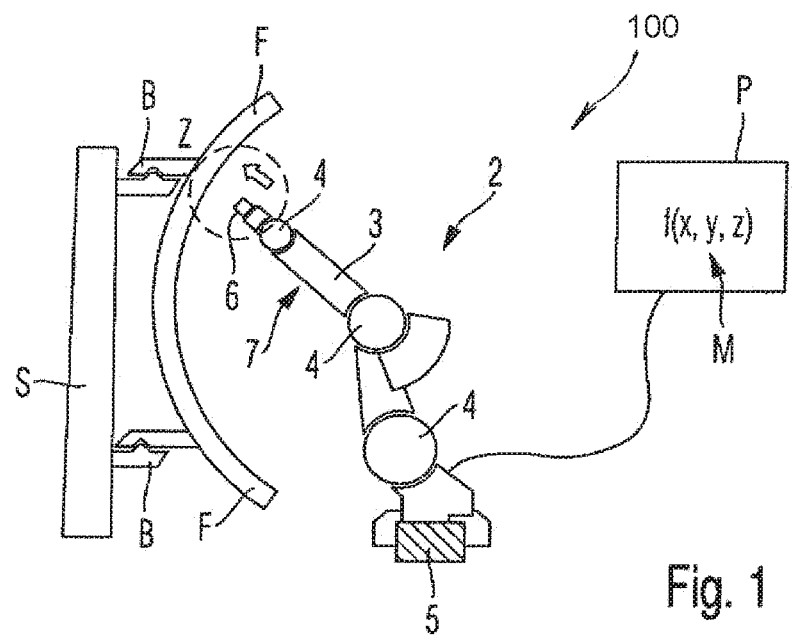
FIG. 1 is a schematic side view of a section of a fuselage or hull structure of an aircraft, upon which a fixture or bracket is being installed according to an embodiment of the disclosure herein.

With reference firstly to FIG. 1 of the drawings, a system or apparatus 100 for installing a fixture 1, here in the form of a bracket, on an airframe or fuselage structure F of an air-craft according to a method of the disclosure herein is illustrated schematically. The airframe or fuselage structure F of the aircraft in this embodiment comprises a curved shell section of the fuselage, comprised of a carbon-fiber reinforced polymer composite, which is supported in this case by brace elements B extending horizontally from a vertically extending supporting framework S. Also shown in FIG. 1 is a robot assembly 2, which includes a robotic arm 3 having a plurality of articulated joints 4, each of which is drivable in at least one and preferably in a number of degrees-of-freedom. The robot assembly 2 is itself mounted for translational movement along a rail member 5 in a direction perpendicular to a plane of drawing FIG. 1.

Mounted on a distal end region of the robot arm 3 is a head 6 of an additive manufacturing device 7, which is generally understood or may be referred to as a 3D printer device. This additive manufacturing device 7 may operate on any one of the known 3D printing techniques, such as fused deposition modelling (FDM), laser sintering (LS), or stereo-lithography (SLA). Particularly preferred in this embodiment is a fused deposition modelling (FDM) device 7. The movement of the robotic assembly 2, and more particularly of the robot arm 3 via the articulated joints 4 and its position along the rail member 5, are computer-controlled via a computer processor P (illustrated schematically here, and shown later in FIG. 7), which also controls operation of the additive manufacturing device 7. During installation of a new fixture or bracket 1 according to the inventive method, the head 6 of the device 7 is moved by the robot arm 3 in the direction of the arrow in FIG. 1 to a predetermined position or surface region Z on the fuselage shell F.

Referring now also to FIGS. 2(a) to 2(d) of the drawings, the steps of forming or building the fixture or bracket 1 in the surface region Z of the fuselage structure F is illustrated schematically in the series of four images (a) to (d). In the image of FIG. 2(a), the head 6 of the FDM device 7 arranged at the distal end region of the robotic arm 3 has been moved into proximity with the surface of the fuselage structure F of the aircraft at position Z. A three-dimensional digital model M of the fixture or bracket 1 is provided or generated in the computer processor P and, based upon the data in this digital model M of the bracket 1, the computer processor P then controls the head 6 of the FDM device 7 to deposit layers of polymer material onto the CFRP fuselage structure as the head 6 of the device 7 is moved along the surface of shell structure F in the direction of the arrow in FIG. 2(a). Then, in FIG. 2(b), one or more layers L1 of the bracket 1 has/have been deposited upon the fuselage structure F at the predetermined position Z, which layer(s) is/are bonded or fused to CFRP structure F.

The head 6 of the FDM device 7 is then moved slightly away from the fuselage structure F in the direction of the arrow shown in FIG. 2(b). As shown in FIG. 2(c), the head 6 may then commence deposition of one or more new layers L2 of the polymer material, which builds upon the previous layers L1 and thus builds-up the three-dimensional shape or form of the fixture or bracket 1. This procedure continues with reference to FIG. 2(d) of the drawings until the final 3D shape of the bracket 1 has been completed.

Figure 3:
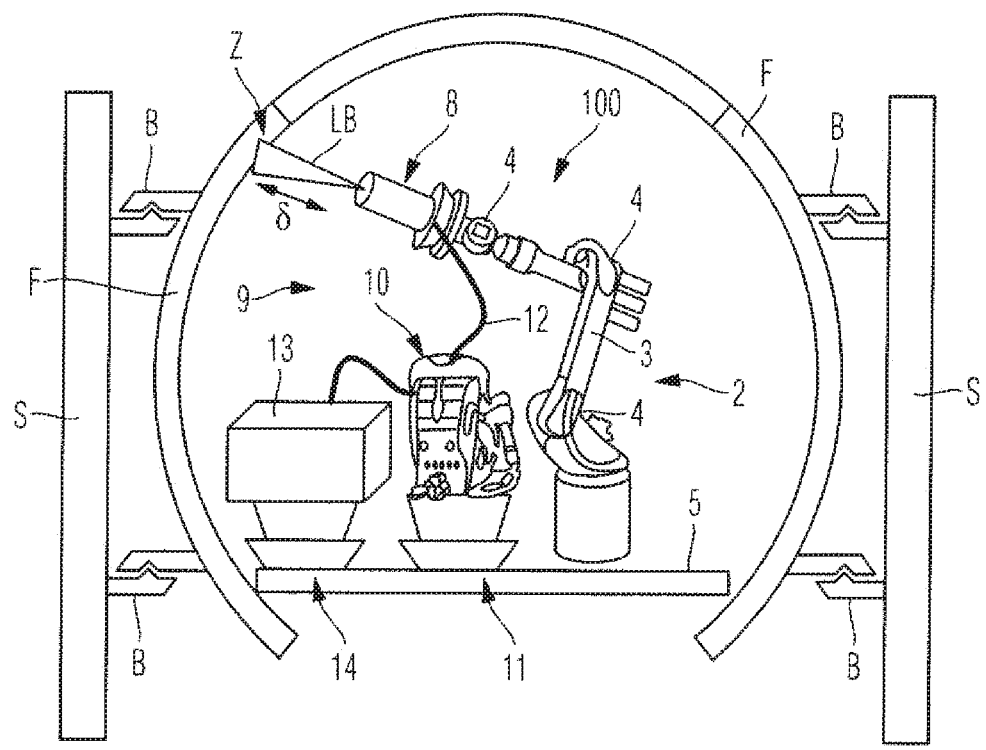
FIG. 3 is a schematic side view of a section of a fuselage or hull structure of an aircraft, and an apparatus according to an embodiment of the disclosure herein with which a fixture or bracket is installed in situ.
Figure 4:
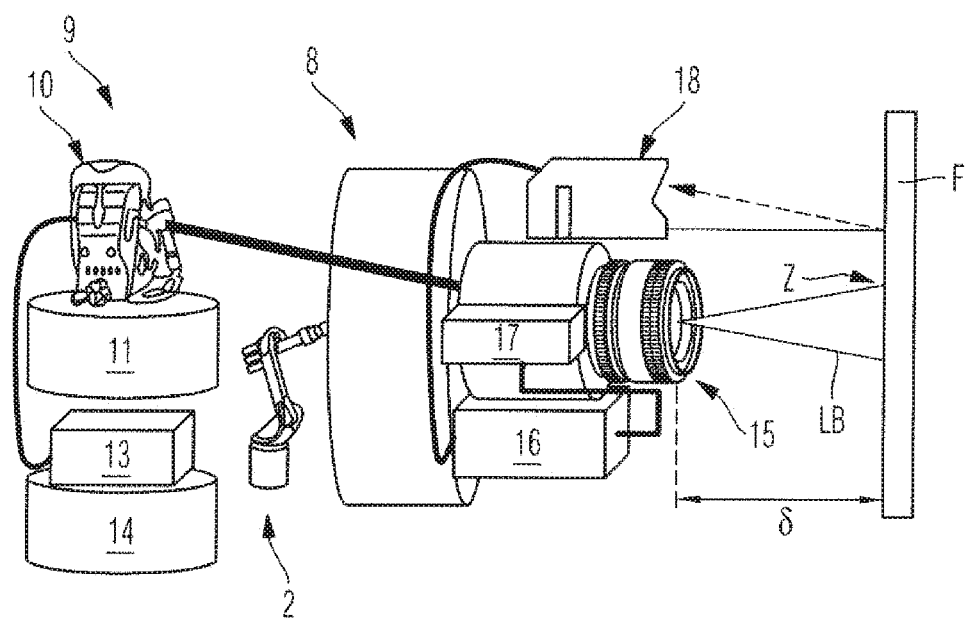
FIG. 4 is a schematic side view of the apparatus according to the embodiment of FIG. 3 showing the parts of the apparatus for performing a pre-treatment of a surface region of the structure in more detail.

Before the controller or processor P commences operating the ALM or additive manufacturing device 7 mounted on the robotic assembly 2, however, the apparatus 100 is used or employed to pre-treat the surface region Z at which the bracket 1 is to be installed on the structure F by heat ablation. To this end, as illustrated in FIGS. 3 and 4 of the drawings, the apparatus 100 further includes an ablation device 9, a head 8 of which is mounted on a distal end region of a robot arm 3 in the robotic assembly 2. As noted above, movement of the robotic assembly 2, and specifically of the robot arm 3 via the articulated joints 4, is controlled via the processor P.

Referring to FIG. 3, in this embodiment the ablation device 9 is a laser ablation device configured to generate and direct a laser beam LB onto the fuselage structure F for laser ablating the targeted surface region Z. The ablation device 9 includes a laser generator 10 in the form of a CL20 backpack which is supported on a carriage robot 11 and connected with the laser ablation head 8 via an optical cable 12, e.g., of optical fibers, for transmitting the laser beam LB. The laser generator 10 is rated at 20 W, generates a laser beam LB with a wavelength of 1000 nm, and is powered by a portable battery pack 13, which is movably supported on a carriage robot 14 within the apparatus 100.

As represented only very schematically in drawing FIG. 4, the laser ablation head 8 includes a focusing lens 15, a focusing control unit 16 and a battery unit 17, which together operate to adjust a focal length of the laser beam LB emitted from the head 8. In this way, the focusing lens 15 and focusing control unit 16 cooperate to adjust an intensity of the laser ablation. Further, the head 8 of the laser ablation device 9 includes a position sensor unit 18 for detecting a spacing or gap δ (and, thus, also a displacement or change in position) of the head 8 with respect to the surface region Z being pre-treated by laser ablation. This spacing or gap δ, which will generally correspond to the focal length adjusted via lens 15 and control unit 16, is typically within the range of about 50 mm to about 100 mm. Furthermore, with laser ablating, the spacing or gap δ is typically controlled and maintained very precisely.

Figure 5:
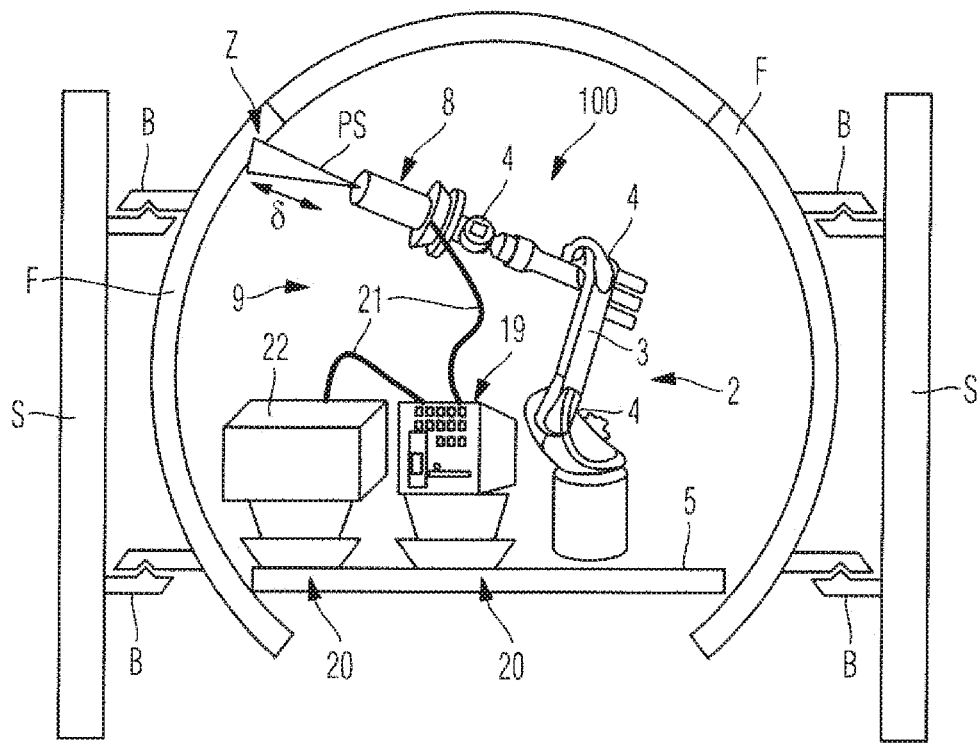
FIG. 5 is a schematic side view of a section of a fuselage or hull structure of an aircraft, and an apparatus according to another embodiment of the disclosure herein for installing a fixture or bracket in situ.
Figure 6:
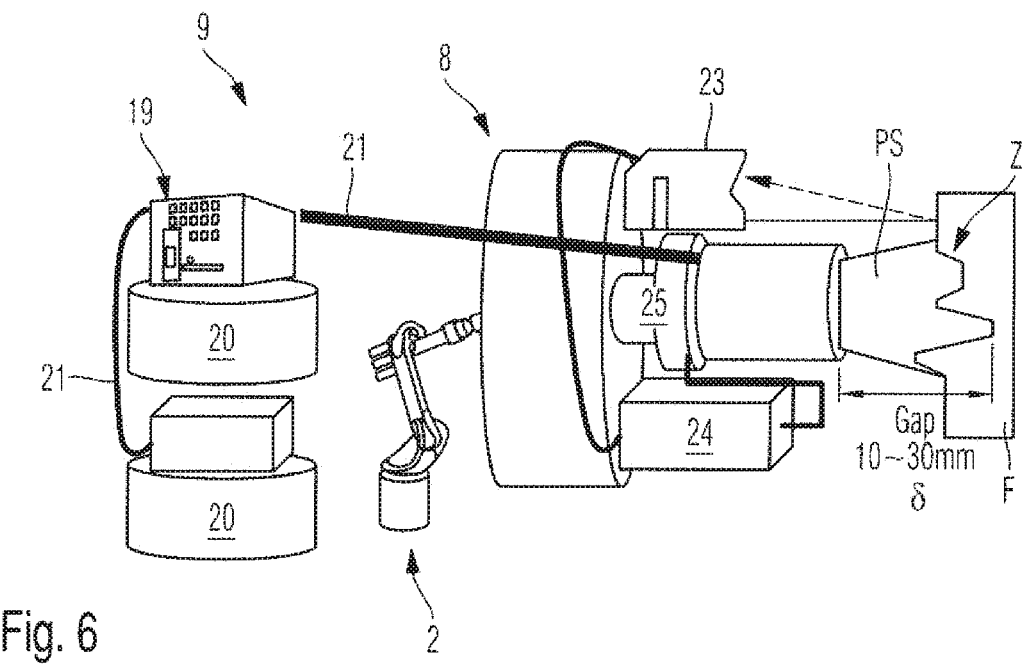
FIG. 6 is a schematic side view of the apparatus according to the embodiment of FIG. 5 showing the parts of the apparatus for performing a pre-treatment of a surface region of the structure in more detail.

With reference now to FIGS. 5 and 6 of the drawings, it will be noted that, in another embodiment of the apparatus 100, the ablation device 9 is a plasma ablation device configured to generate and direct a plasma stream PS onto the fuselage structure F for plasma ablating the desired surface region Z. The plasma ablation device 9 comprises a generator control unit 19 which is supported on a movable carriage robot 20 and connected via a power cable 21 both with a battery pack 22 (also on a carriage robot 20) and with the plasma head 8. The plasma ablation device 9 in this case operates at 600 W on AC having 10 kV and 60 mA.

The plasma stream PS itself is generated at the head 8, which is an air flow coupled plasma head 8. As is represented only very schematically in drawing FIG. 6, the ablation head 8 in this case includes a position sensor unit 23, a gap control unit 24, and a ball screw and motor 25, which co-operate to monitor and adjust the spacing or gap δ (and, thus, also a displacement or change in position) of the ablation head 8 with respect to the surface region Z being pre-treated. This spacing or gap δ is typically within the range of about 10 mm to about 30 mm, but high precision is generally not required.

Fourier transform infrared spectroscopy (FTIR) NDI equipment may be employed to check the degree of residue removal and/or heat damage by the heat ablation pre-treatment. If a long time has elapsed since heat ablation pre-treating a surface region, a re-treatment of the surface may be conducted to ensure or maintain the good surface condition by the pre-treatment process. Such a re-treatment process will generally be the same as described above, but the power or intensity may be lower in view of the low amount of material to remove.

Figure 7:
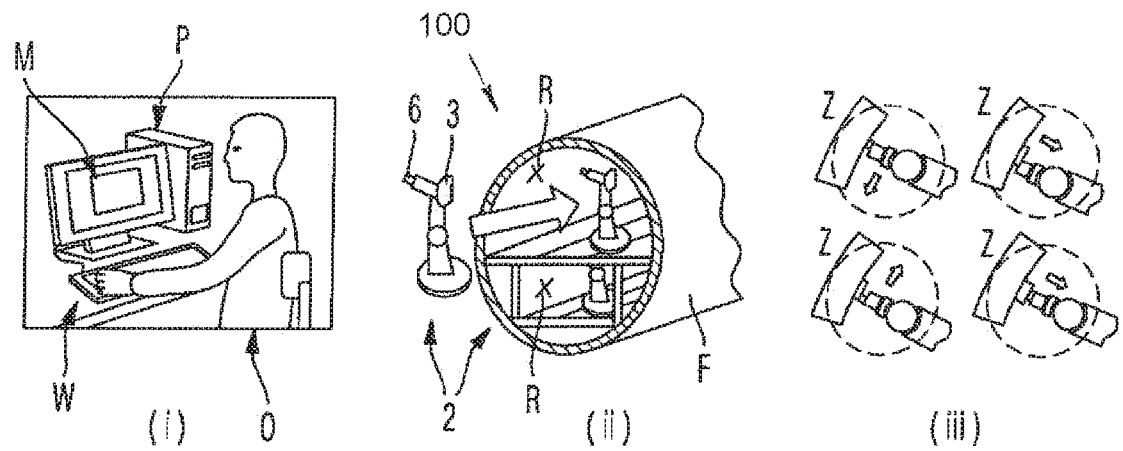
FIG. 7 schematically shows three stages (i) to (iii) of a method or technique of installing the fixture or bracket according to a particular embodiment.

With reference also now to FIG. 7 of the drawings, the method according to this preferred embodiment of the disclosure herein is illustrated in the three stages (i) to (iii). For example, in FIG. 7(*i*) an operator O is shown at a work-station W of the computer processor P engaged in the task of providing and/or generating the three-dimensional (3D) digital model M of the fixture or bracket 1 to be installed according to the method of this embodiment. The computer processor P at which the operator O is working is also responsible for the computer-controlled operation of the robot assembly 2, as well as both the additive manufacturing device 7 and the ablation device 9 described above with respect to FIGS. 1 to 6.

FIG. 7(*ii*) schematically illustrates the step of positioning the robot assembly 2 with respect to the fuselage structure F upon which the bracket 1 is to be formed and installed. In this regard, the robot assembly 2 is movable on one or more rails 5 within the tubular fuselage structure F, preferably on one of a plurality of separate rails 5, e.g., at separate heights or separate floors in the fuselage F. In this regard, the fuselage structure F may be a tubular shell as seen in FIG. 7(*ii*), rather than just a shell section shown in FIG. 1. Also, the robot assembly 2 may include a plurality of robotic arms 3 for simultaneously operating at various different positions Z within the fuselage structure F, i.e., in order to simultaneously pre-treat the respective surface regions and to build and install a plurality of fixtures or brackets 1 at different positions Z.

With regard to the positioning of the robotic assembly 2, the digital model M of the fixture or bracket 1 may include data concerning a specific desired or predetermined surface region or position Z on the fuselage structure F for a particular bracket 1. This data can then be used together with reference markers R provided on the fuselage structure F, which are preferably detectable and identifiable by sensors (not shown) provided on the robot assembly 2 to give spatial correlation for moving the robotic arm 3 relative to the body or fuselage structure F, and especially the head 9 of an ablation device 8 and the head 6 of an additive manufacturing device 7, to the correct position or surface region Z for pre-treating the surface and then forming and installing a specific bracket 1 based upon the data in the digital model M. The data in the digital model may also include detailed data on the structure F in or on which the bracket or fixture 1 is to be installed.

In other words, FIG. 7(*ii*) represents controlling operation of both the ablation device 9 and the additive manufacturing device 7 in the apparatus 100 for performing both the steps of: pre-treating the surface region Z of the structure F by heat ablation using the ablation device 9 provided on the robotic assembly 2, and then forming the bracket or fixture 1 in situ on the structure at the pre-treated surface region Z using the ALM device 7 on the robotic assembly 2.

Figure 2:
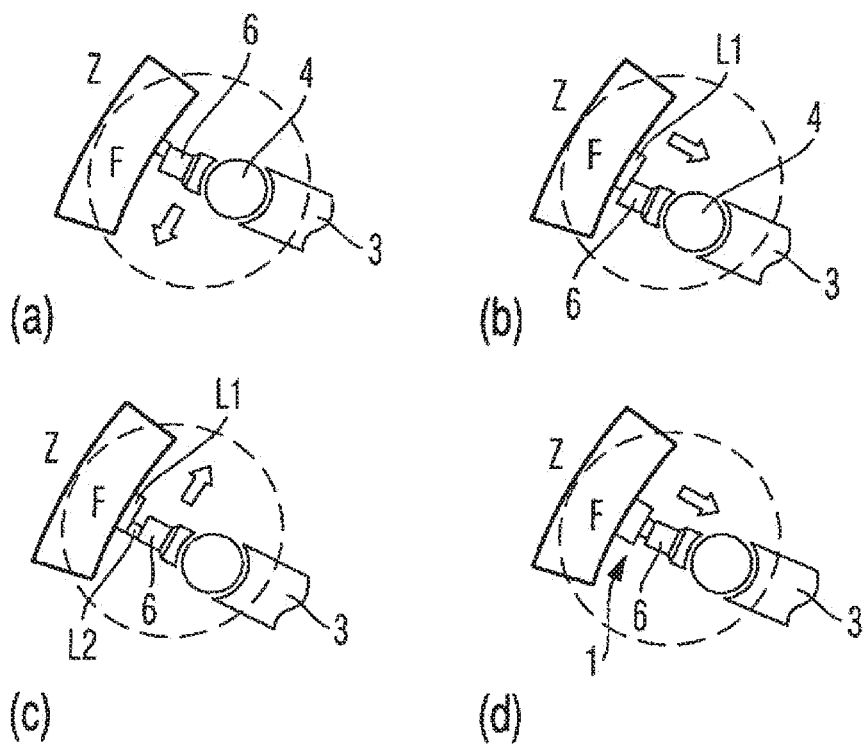
FIG. 2 shows four schematic side views (a) to (d) of the fuselage or hull structure in FIG. 1, upon which the fixture or bracket is being installed according to an embodiment of the disclosure herein.

FIG. 7(*iii*) essentially corresponds to FIG. 2 of the drawings and schematically illustrates the sequential deposition or layer build-up and installation of a particular bracket 1 at the desired or predetermined position Z within the fuselage structure F, with the bracket 1 being simultaneously bonded or fused to the material of the fuselage structure F.

Figure 8:
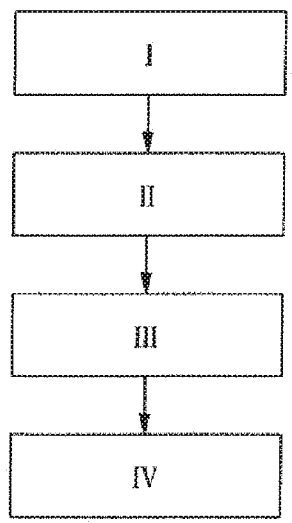
FIG. 8 is a flow diagram which schematically illustrates a method according to a preferred embodiment.

Referring now to FIG. 8 of the drawings, a flow diagram is shown that again schematically illustrates the steps in the method of the preferred embodiment. In this regard, the first box I of FIG. 8 represents the step of arranging an apparatus 100 in, on or adjacent to the structure F, as generally shown in FIGS. 1, 3 and 5 of the drawings. The second box II then represents the step of pre-treating a surface region Z of the structure F by heat ablation using the laser/plasma ablation device 9 on the apparatus 100 to remove contaminant residues from the surface region Z and thereby to prepare the surface region Z for connection of the bracket or fixture 1. In this regard, this step involves controlling movement of the head 8 of the ablation device 9 with respect to the predetermined position Z in the fuselage structure F based on position data in the digital model M of the bracket or fixture 1 via the processor or control unit P. The third box III represents the step of depositing one or more layer or region of adhesive on the pre-treated surface region Z for subsequently bonding the bracket or fixture 1 to the CFRP fuselage structure F. The final box IV in drawing FIG. 8 represents the step of forming the bracket 1 in situ on the fuselage structure F with the head 6 of the FDM device 7. This involves moving the head 6 of the FDM device 7 to the pre-treated surface region Z in the fuselage structure F based on position data in the three-dimensional digital model M and then sequentially building up the bracket 1 in layers L1, L2 based upon the digital model M in the computer processor P, which operates and controls the robot assembly 2 carrying the FDM device 7. The bracket 1 is connected by bonding to the CFRP fuselage structure F as the bracket 1 is formed.

Figure 9:
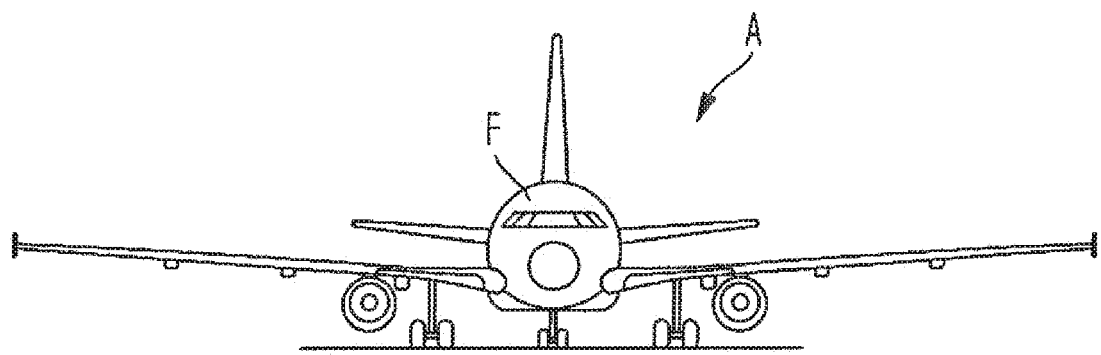
FIG. 9 is a schematic illustration of an aircraft in which one or more brackets according to an embodiment of the disclosure herein are installed.

Following the above description of the method and apparatus of the disclosure herein, FIG. 9 of the drawings now schematically illustrates an aircraft A that incorporates a fuselage structure F, in which at least one fixture or bracket 1, and preferably a plurality thereof, has or have been installed according to a method of the present disclosure.

Figure 10:
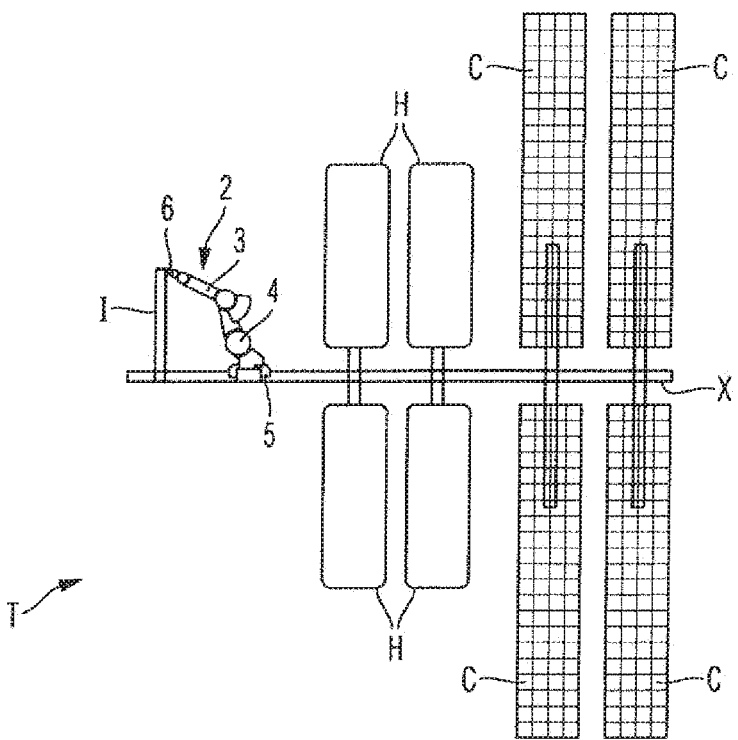
FIG. 10 is a schematic view of a space station upon which a fixture or element is being installed according to an embodiment of the disclosure herein.

With reference to FIG. 10 of the drawings, on the other hand, an alternative embodiment is now illustrated schematically. In this embodiment, the inventive method is being carried out on a space station T which is currently in orbit. The space station T includes solar collector modules C, modules H for human occupation, and an antenna module I, all of which are interconnected by a structural framework X. In this example, the method is employed to conduct a repair to a part on the antenna module I. Again, a robot assembly 2, which includes a robotic arm 3 having remotely controlled articulated joints 4 is employed, which avoids the need for an astronaut to under-take a space-walk. The structural framework X may include one or more rails 5 for guiding movement of the robot 2 to the antenna module I. Also, a head 6 of an additive manufacturing device 7 or 3D printer device is mounted at an end region of the robotic arm 3. In this way, the method described above with reference to FIGS. 1-8 can be performed with the robot assembly 2 on the space station T to generate and install a new element or fixture 1 to repair the antenna module I. In the event that no rails 5 are available for the robot 2 on the structural framework X, it will be noted that the head 6 of the additive manufacturing device 7 may also be used to generate and install rail members 5 on the framework X of the space station T according to the method of the disclosure herein for guiding the robotic assembly 2 to that part of the antenna module I to be repaired.

Although specific embodiments of the disclosure herein have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e., non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method of installing a mounting fixture in or on a structure of an aircraft or spacecraft, the method comprising:
    arranging an apparatus in, on or adjacent the structure;
    pre-treating a surface region of the structure by ablation using the apparatus; and
    forming the mounting fixture in situ on the structure at the pre-treated surface region using the apparatus based on a digital model of the mounting fixture,
    wherein the mounting fixture is installed by connecting the mounting fixture to the structure at the pre-treated surface region as the mounting fixture is formed.

2. The method of claim 1, wherein pre-treating the surface region of the structure by ablation comprises laser ablating the surface region via a laser ablation device.

3. The method of claim 2, wherein laser ablating the surface region comprises one or more of:
    generating a laser beam;
    positioning a head of the laser ablation device at a predetermined spacing from the structure;
    focusing the laser beam onto the surface region of the structure; and
    moving the laser beam over the surface region at a predetermined spacing from the structure.

4. The method of claim 1, wherein pre-treating the surface region of the structure by ablation comprises plasma ablating the surface region via a plasma ablation device.

5. The method of claim 4, wherein plasma ablating the surface region comprises one or more of:
    generating a plasma stream;

positioning a head of a plasma ablation device at a predetermined spacing from the structure;

focusing the plasma stream onto the surface region of the structure; and moving the plasma stream over the surface region at a predetermined spacing from the structure.

6. The method of claim 1, wherein the digital model of the mounting fixture includes data on an intended position of the mounting fixture within structure, wherein pre-treating the surface region of the structure includes positioning a head of the ablation device adjacent the structure based on the digital model of the mounting fixture, whereby the structure can include one or more reference markers for spatial correlation to reference points in the digital model of the mounting fixture.

7. The method of claim 1, wherein forming the mounting fixture in situ comprises building the mounting fixture sequentially, preferably by generating and building up layers of the mounting fixture in the surface region with an additive manufacturing device, wherein the layers of the mounting fixture are sequentially deposited on the structure.

8. The method of claim 1, wherein connecting the mounting fixture to the structure includes at least one of:

bonding or fusing one or more of the layers of the mounting fixture to the structure as they are generated; and forming the mounting fixture in situ in a mechanical fit or a mechanical engagement with part of the structure.

9. The method of claim 8, wherein bonding the mounting fixture to the structure includes depositing one or more layer or region of adhesive on the pre-treated surface region.

10. An apparatus for installing a mounting fixture in or on a structure of an aircraft or spacecraft, the apparatus comprising:

a robot assembly movable with respect to the structure;

an ablation device mounted on the robot assembly, the ablation device being configured for generating and directing an ablating beam onto a surface region of the structure to pre-treat the surface region;

an additive manufacturing device mounted on the robot assembly, the additive manufacturing device being configured for forming the mounting fixture in situ on the pre-treated surface region; and a controller for controlling or operating the ablation device and/or the additive manufacturing device at the surface region of the structure.

11. The apparatus of claim 10, wherein the ablation device comprises a laser ablation device for laser ablating the surface region, wherein the laser ablation device includes a head having one or more of: laser focussing device to adjust a focal length of the laser beam, and at least one sensor for detecting a spacing or displacement of the head with respect to the surface region.

12. The apparatus of claim 10, wherein the ablation device comprises a plasma ablation device for plasma ablating the surface region, wherein the plasma ablation device includes a head having one or more of: laser focusing device to direct or focus a plasma stream, and at least one sensor for detecting a spacing or displacement of the head with respect to the surface region.

13. The apparatus of claim 10, wherein the additive manufacturing device comprises a head for building the mounting fixture sequentially, especially by generating and building up layers of the mounting fixture on the structure, wherein the layers of the mounting fixture are sequentially deposited on the structure by the head.

14. The apparatus of claim 10, wherein each of the additive manufacturing device and the ablation device are mounted on one of a plurality of robotic arms of the robot assembly for adjusting a position thereof with respect to the structure.

15. The apparatus of claim 10, wherein the controller operates or controls based on a digital model of the mounting fixture or structure.

16. The method of claim 9, wherein depositing one or more layer or region of adhesive on the pre-treated surface region is performed before generating and building up layers of the mounting fixture on the structure.

* * * * *